US010018502B2

(12) United States Patent
Mushimoto et al.

(10) Patent No.: US 10,018,502 B2
(45) Date of Patent: Jul. 10, 2018

(54) LASER SCANNER

(71) Applicant: FUNAI ELECTRIC CO., LTD., Osaka (JP)

(72) Inventors: Atsushi Mushimoto, Daito (JP); Ryusuke Horibe, Hirakata (JP); Manabu Murayama, Itami (JP); Yuichiro Masuda, Takatsuki (JP); Tomohisa Hirai, Osaka (JP); Shingo Setono, Ikoma (JP)

(73) Assignee: FUNAI ELECTRIC CO., LTD., Osaka (JP)

( * ) Notice: Subject to any disclaimer, the term of this patent is extended or adjusted under 35 U.S.C. 154(b) by 386 days.

(21) Appl. No.: 14/800,816

(22) Filed: Jul. 16, 2015

(65) Prior Publication Data

US 2016/0018256 A1 Jan. 21, 2016

(30) Foreign Application Priority Data

Jul. 18, 2014 (JP) ................................. 2014-148043

(51) Int. Cl.
*G01C 3/08* (2006.01)
*G01J 1/02* (2006.01)
(Continued)

(52) U.S. Cl.
CPC ........... *G01J 1/0238* (2013.01); *G01J 1/4257* (2013.01); *G01J 1/44* (2013.01); *G01S 7/4817* (2013.01);
(Continued)

(58) Field of Classification Search
CPC ........ G01S 17/08; G01S 17/42; G01S 7/4817; G01S 7/4972; G01J 2001/444
(Continued)

(56) References Cited

U.S. PATENT DOCUMENTS 7,872,782 B2 1/2011 Sakakibara
2002/0149512 A1* 10/2002 Oki .................... G01S 7/484
342/70
(Continued)

FOREIGN PATENT DOCUMENTS

JP 6-123845 5/1994
JP 3518099 4/2004
(Continued)

OTHER PUBLICATIONS

Partial European Search Report dated Dec. 16, 2015 in corresponding European Application No. 15176828.0.

*Primary Examiner* — Mark Hellner
(74) *Attorney, Agent, or Firm* — Wenderoth, Lind & Ponack, L.L.P.

(57) ABSTRACT

A laser scanner includes: a light source; a scanning mirror that scans laser light emitted from the light source, toward a target object by oscillating about axis C; a photodetector that generates a photodetection signal upon receiving the laser light reflected from the target object; a controller that controls emission of the laser light by the light source, and that performs sampling on the photodetection signal; and a detector that detects an amount of displacement of the scanning mirror, and calculates a resonant frequency of the scanning mirror based on the amount of displacement detected. The controller determines a time at which the laser light is emitted from the light source and a time at which sampling is performed on the photodetection signal, based on the resonant frequency calculated.

12 Claims, 6 Drawing Sheets

(51) Int. Cl.
  *G01S 17/08*   (2006.01)
  *G01S 7/481*   (2006.01)
  *G01J 1/42*    (2006.01)
  *G01J 1/44*    (2006.01)
  *G01S 17/42*   (2006.01)
  *G01S 7/497*   (2006.01)

(52) U.S. Cl.
  CPC ............ *G01S 7/4972* (2013.01); *G01S 17/08* (2013.01); *G01S 17/42* (2013.01); *G01J 2001/444* (2013.01)

(58) Field of Classification Search
  USPC ....................................................... 356/4.01
  See application file for complete search history.

(56) References Cited

U.S. PATENT DOCUMENTS

| | | | |
|---|---|---|---|
| 2004/0240017 A1* | 12/2004 | Kandori | G02B 26/0816 359/196.1 |
| 2008/0043295 A1 | 2/2008 | Sakakibara | |
| 2010/0002279 A1 | 1/2010 | Aoki | |
| 2010/0165323 A1 | 7/2010 | Fiess et al. | |
| 2011/0285444 A1 | 11/2011 | Uemura et al. | |
| 2012/0236379 A1* | 9/2012 | da Silva | G01S 7/4817 359/200.8 |

FOREIGN PATENT DOCUMENTS

| | | |
|---|---|---|
| JP | 2006-276634 | 10/2006 |
| JP | 2010-000794 | 1/2010 |
| JP | 4857582 | 1/2012 |
| JP | 2012-53216 | 3/2012 |
| JP | 2013-210316 | 10/2013 |

* cited by examiner

LASER SCANNER

CROSS REFERENCE TO RELATED APPLICATION

The present application is based on and claims priority of Japanese Patent Application No. 2014-148043 filed on Jul. 18, 2014. The entire disclosure of the above-identified application, including the specification, drawings and claims is incorporated herein by reference in its entirety.

FIELD

The present invention relates to a laser scanner for scanning laser light toward a target object.

BACKGROUND

A laser scanner that scans laser light toward a target object is known (for example, see Patent Literature (PTL) 1). Such a laser scanner includes a scanning mirror on the path of the laser light emitted from a light source. The scanning mirror scans the laser light emitted from the light source, toward the target object by oscillating about a predetermined axis at a resonant frequency. The resonant frequency is a frequency specific to the scanning mirror. As FIG. 6 illustrates, the gain characteristics of the scanning mirror are maximum at the resonant frequency. Accordingly, while the scanning mirror is oscillating at the resonant frequency, the amplitude of oscillation of the scanning mirror is maximum. The laser light reflected from the target object is reflected off the scanning mirror again, and then received by a photodetector. The distance between the laser scanner and the target object can be measured based on the laser light received by the photodetector in the above manner.

The laser scanner is also capable of measuring the shape of the target object based on the laser light received by the photodetector. The shape of the target object can be measured through arithmetic processing, by measuring approximately how much the reflected position (measurement point) of the laser light on the target object has temporally changed while oscillating the scanning mirror at a predetermined amplitude. Accordingly, it is important for the laser scanner to detect the laser light reflected from the same measurement point on the target object, at accurate timing.

CITATION LIST

Patent Literature

[PTL 1] Japanese Unexamined Patent Application Publication No. 2012-53216

SUMMARY

Technical Problem

However, in the conventional laser scanner described above, the resonant frequency of the scanning mirror may change due to the influence from change in usage environment (for example, temperature and pressure). Change in resonant frequency of the scanning mirror results in change in deflection angle of the scanning mirror when the scanning mirror reflects the laser light toward the same measurement point on the target object. This causes a problem in that the laser light reflected from the same measurement point on the target object cannot be received at accurate timing.

The present invention has been conceived to solve such a problem. An object of the present invention is to provide a laser scanner capable of receiving the laser light reflected from the same measurement point on the target object, at accurate timing even when the resonant frequency of the scanning mirror changes.

Solution to Problem

In order to achieve the above object, a laser scanner according to one aspect of the present invention is a laser scanner for scanning laser light toward a target object. The laser scanner includes: a light source that emits laser light; a scanning mirror that scans the laser light emitted from the light source, toward the target object by oscillating about a predetermined axis; a photodetector that generates a photodetection signal upon receiving the laser light reflected from the target object; a controller that controls emission of the laser light by the light source, and that performs sampling on the photodetection signal; and a detector that detects an amount of displacement of the scanning mirror, and calculates a resonant frequency of the scanning mirror based on the amount of displacement detected. The controller determines a time at which the laser light is emitted from the light source and a time at which sampling is performed on the photodetection signal, based on the resonant frequency calculated.

According to this aspect, for example, when the resonant frequency of the scanning mirror changes, the controller determines, based on the changed resonant frequency, the time at which the laser light is emitted from the light source and the time at which sampling is performed on the photodetection signal. With this, the controller performs sampling on the photodetection signal synchronously with the operation of the scanning mirror, and the light source emits laser light synchronously with the operation of the scanning mirror. As a result, even when the resonant frequency of the scanning mirror changes, the laser light reflected from the same measurement point on the target object can be received at accurate timing.

For example, in the laser scanner according to one aspect of the present invention, it may be that the detector further calculates an amplitude of oscillation of the scanning mirror based on the amount of displacement detected, and that the controller calculates a time at which a deflection angle of the scanning mirror becomes a predetermined deflection angle, based on the resonant frequency calculated and the amplitude of oscillation calculated, and determines, based on the time calculated and the resonant frequency calculated, a time at which the laser light is emitted from the light source toward the scanning mirror having the predetermined deflection angle, and a time at which sampling is performed on the photodetection signal for the laser light reflected from the scanning mirror having the predetermined deflection angle.

According to this aspect, the controller determines, based on the calculated time and the calculated resonant frequency, the time at which the laser light is emitted from the light source toward the scanning mirror having a predetermined deflection angle, and the time at which sampling is performed on the photodetection signal for the laser light reflected from the scanning mirror having the predetermined deflection angle. With this, the time at which sampling is performed on the photodetection signal and the time at which the laser light is emitted can be synchronized with the operation of the scanning mirror.

For example, the laser scanner according to one aspect of the present invention may further include a phase locked loop (PLL) circuit unit that generates a timing clock signal having a phase synchronized with a phase of the resonant frequency calculated by the detector. It may be that the controller determines a time at which the laser light is emitted from the light source and a time at which sampling is performed on the photodetection signal, based on the timing clock signal.

According to this aspect, the controller performs sampling on the photodetection signal synchronously with the timing clock signal, and the light source emits laser light synchronously with the timing clock signal.

For example, the laser scanner according to one aspect of the present invention may further include a light source driver that causes the light source to emit the laser light, based on a light source driving signal output from the controller. It may be that the controller outputs, to the light source driver, the light source driving signal having a phase synchronized with the phase of the timing clock signal.

According to this aspect, the light source driver is capable of causing the light source to emit laser light based on the light source driving signal which is synchronized with the timing clock signal.

For example, in the laser scanner according to one aspect of the present invention, it may be that the controller determines whether or not the laser scanner is in a defective state, based on the resonant frequency calculated.

According to this aspect, the controller determines whether or not the laser scanner is in a defective state, based on the calculated resonant frequency. With this, a defective state of the laser scanner can be detected early and reliably.

For example, in the laser scanner according to one aspect of the present invention, it may be that the detector further calculates an amplitude of oscillation of the scanning mirror based on the amount of displacement detected, and the controller determines whether or not the laser scanner is in a defective state based on the amplitude of oscillation calculated.

According to this aspect, the controller determines whether or not the laser scanner is in a defective state, based on the calculated amplitude of oscillation. With this, a defective state of the laser scanner can be detected early and reliably.

For example, in the laser scanner according to one aspect of the present invention, it may be that the controller causes the light source to stop emitting the laser light when the controller determines that the laser scanner is in the defective state.

According to this aspect, it is possible to prevent the laser light from being continuously emitted to the same portion of the target object.

For example, in the laser scanner according to one aspect of the present invention, it may be that the controller causes the light source to stop emitting the laser light and causes the scanning mirror to stop oscillating, when the controller determines that the laser scanner is in the defective state.

According to this aspect, it is possible to prevent the laser light from being continuously emitted to the same portion of the target object.

For example, in the laser scanner according to one aspect of the present invention, it may be that the controller turns off the laser scanner when the controller determines that the laser scanner is in the defective state.

According to this aspect, it is possible to prevent the laser light from being continuously emitted to the same portion of the target object.

For example, in the laser scanner according to one aspect of the present invention, it may be that the controller restarts the laser scanner when the controller determines that the laser scanner is in the defective state.

According to this aspect, it is possible to prevent the laser light from being continuously emitted to the same portion of the target object.

For example, in the laser scanner according to one aspect of the present invention, it may be that the detector receives the laser light scanned by the scanning mirror toward the target object, and detects, as the amount of displacement, a length of a time period between two successive receptions of the laser light, the two successive receptions of the laser light resulting from the laser light traversing the detector back and forth.

According to this aspect, the detector detects, as the amount of displacement, the length of a time period between two successive receptions of the laser light. The two successive receptions of the laser light result from the laser light traversing the detector back and forth. Accordingly, the resonant frequency of the scanning mirror can be easily calculated based on the detected length.

For example, in the laser scanner according to one aspect of the present invention, it may be that the controller calculates a distance between the laser scanner and the target object based on a phase difference between the laser light emitted from the light source and the laser light received by the photodetector.

According to this aspect, the laser scanner is applicable as a laser rangefinder.

The present invention can be implemented not only as a laser scanner including such characteristic processing units, but also as a control method including, as steps, processing executed by the characteristic processing units included in the laser scanner. Moreover, the present invention can also be implemented as a program for causing a computer to function as the characteristic processing units included in the laser scanner, or a program casing a computer to execute the characteristic steps included in the control method. Such programs can be, of course, distributed via a computer-readable non-transitory storage medium such as a compact disc-read only memory (CD-ROM) or a communication network such as the Internet.

Advantageous Effects

According to a laser scanner in one aspect of the present invention, laser light reflected from the same measurement point on the target object can be received at accurate timing even when the resonant frequency of the scanning mirror changes.

BRIEF DESCRIPTION OF DRAWINGS

These and other target objects, advantages and features of the invention will become apparent from the following description thereof taken in conjunction with the accompanying drawings that illustrate a specific embodiment of the present invention.

DESCRIPTION OF EMBODIMENT

Hereinafter, an embodiment according to the present invention will be described in detail with reference to the accompanying drawings. The following embodiment describes a general or specific example. The numerical values, shapes, materials, structural elements, the arrangement and connection of the structural elements, steps, and the processing order of steps, etc. shown in the following embodiment are mere examples, and therefore do not limit the present invention. The scope of the present invention is defined by the appended Claims. Therefore, among the structural elements in the following embodiment, structural elements not recited in any one of the independent claims are described as preferred structural elements, and are not absolutely necessary to overcome the problem according to the present invention.

Embodiment

1. Overall Configuration of Laser Scanner

Figure 1:
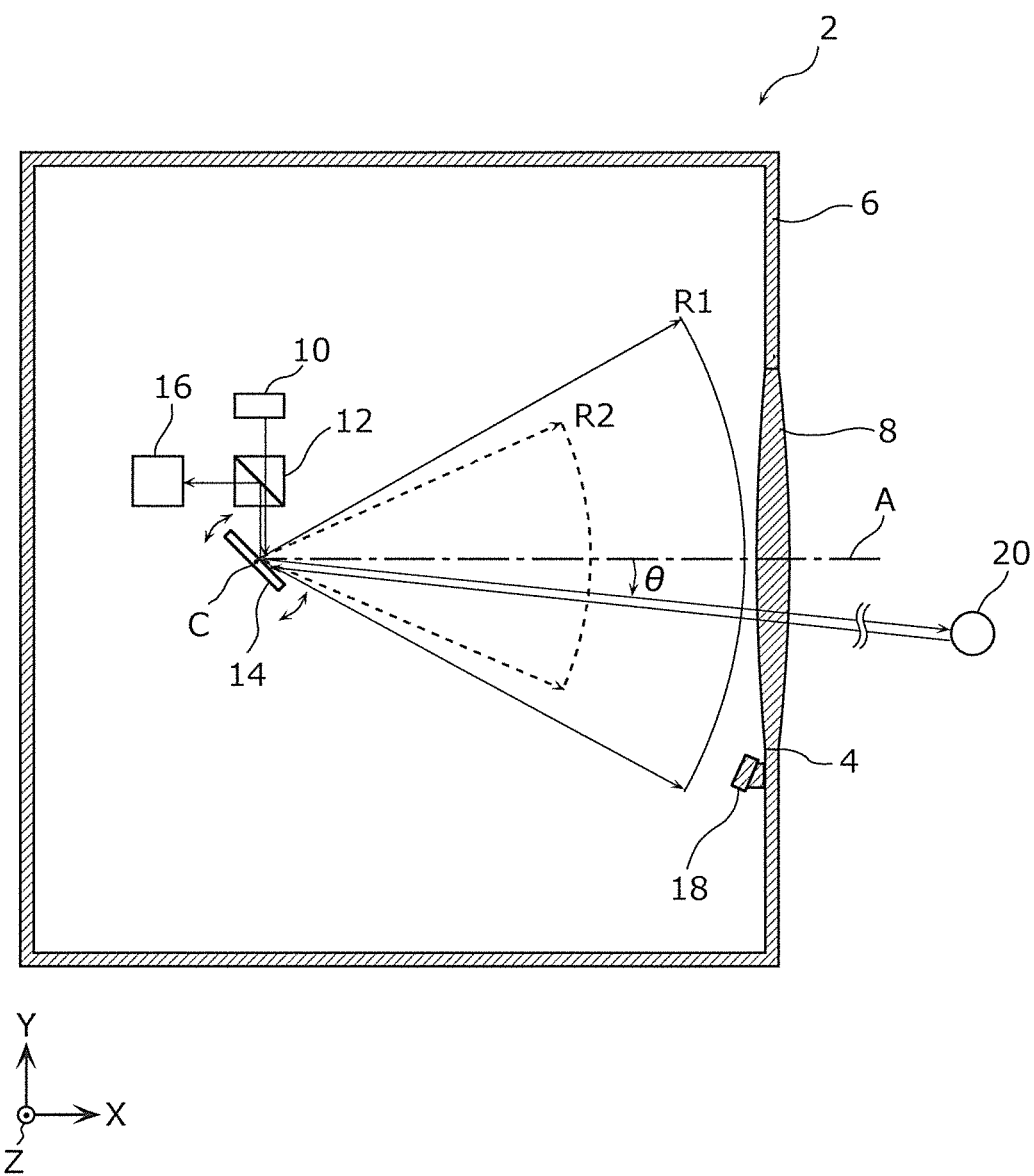
FIG. 1 schematically illustrates a configuration of a laser scanner according to an embodiment.

First, referring to FIG. 1, an overall configuration of a laser scanner 2 according to an embodiment will be described. FIG. 1 schematically illustrates a configuration of a laser scanner according to the embodiment.

As FIG. 1 illustrates, the laser scanner 2 according to the embodiment includes an enclosure 6 including an opening 4 having an approximately circular shape. An optical element 8 is disposed in the opening 4 of the enclosure 6. The optical element 8 is, for example, a lens or an optical plate processed so as to block light other than intended light. The enclosure 6 houses a light source 10, a mirror with an aperture 12, a scanning mirror 14, a photodetector 16, and a detector 18. The laser scanner 2 is for scanning laser light toward a target object 20, and is used, for example, as a laser rangefinder for measuring the distance between the laser scanner 2 and the target object 20.

The light source 10 includes, for example, a laser diode. The light source 10 emits laser light toward the scanning mirror 14 based on a modulated signal output from a light source driver 22 (to be described later).

The mirror with the aperture 12 is disposed on the optical path of the laser light emitted from the light source 10. The mirror with the aperture 12 includes an aperture (not illustrated) through which the laser light emitted from the light source 10 passes. The mirror with the aperture 12 further includes a reflective surface (not illustrated) which reflects the laser light reflected from the scanning mirror 14 (that is, the laser light reflected from the target object 20), toward the photodetector 16.

The scanning mirror 14 is, for example, a micro electro mechanical system (MEMS) mirror including a mirror which is a miniscule mechanical component, disposed on a silicon substrate having an electric circuit thereon. The scanning mirror 14 is oscillated about a predetermined axis C by an oscillator (not illustrated). The axis C extends in the Z-axis direction in FIG. 1. The scanning mirror 14 scans laser light emitted from the light source 10, toward the target object 20 in one axis direction (for example, Y-axis direction) by oscillating about the axis C. The scanning mirror 14 reflects part of the laser light reflected from the target object 20, toward the reflective surface of the mirror with the aperture 12.

The photodetector 16 includes, for example, an avalanche photodiode. The photodetector 16 receives part of the laser light reflected from the target object 20, via the scanning mirror 14 and the mirror with the aperture 12. The photodetector 16 generates a photodetection signal (electric signal) indicating the amount of the laser light received, based on the received laser light.

The detector 18 includes, for example, a photodetector, and receives the laser light scanned by the scanning mirror 14. The detector 18 is disposed near the edge of the opening 4 of the enclosure 6. The detector 18 generates a detection signal (electrical signal) having a voltage value which increases with an increase in intensity of the received laser light.

Figure 2:
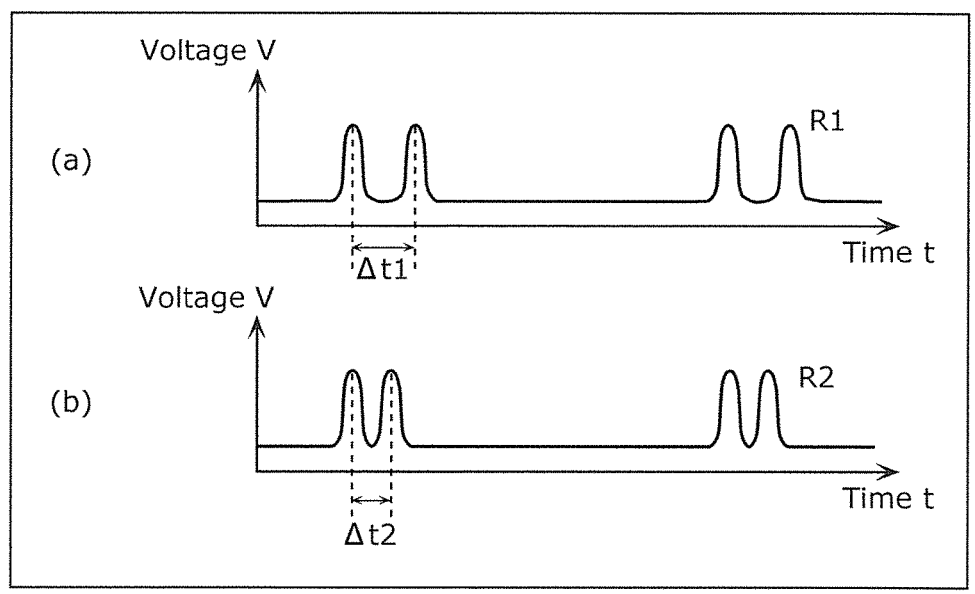
FIG. 2 is a graph illustrating examples of waveforms of a detection signal generated by a detector.

FIG. 2 is a graph illustrating examples of waveforms of a detection signal generated by a detector. In FIG. 2, (a) illustrates the waveform of a detection signal generated by the detector 18 when laser light is scanned in a scanning range R1 in FIG. 1. In FIG. 2, (b) illustrates the waveform of a detection signal generated by the detector 18 when laser light is scanned in a scanning range R2 smaller than the scanning range R1 in FIG. 1.

As (a) and (b) of FIG. 2 illustrate, when the laser light traverses the detector 18, each detection signal generated by the detector 18 has maximum values. The laser light traverses the detector 18 toward one end of the scanning range, and traverses the detector 18 again by returning from the one end of the scanning range toward the other end of the scanning range. By the laser light traversing the detector 18 back and forth in such a manner, a pair of maximum values repeatedly appears in a predetermined interval.

The detector 18 detects, as the amount of displacement of the scanning mirror 14, the length of a time period between two maximum values (that is, the length of a time period between two successive receptions of the laser light by the detector 18), based on the waveform of the detection signal. For example, as (a) in FIG. 2 illustrates, when the laser light is scanned in the scanning range R1, the detector 18 detects the length of time period Δt1 as the amount of displacement of the scanning mirror 14. On the other hand, as (b) in FIG. 2 illustrates, when the laser light is scanned in the scanning range R2 smaller than the scanning range R1, the detector 18 detects, as the amount of displacement of the scanning mirror 14, the length of time period Δt2 shorter than the length of time period Δt1. Accordingly, it is understood that the amplitude of oscillation of the scanning mirror 14 increases with an increase in length of the time period between the two maximum values. The detector 18 calculates the oscillation frequency (resonant frequency) and amplitude of oscillation (amplitude voltage) of the scanning mirror 14, based on the length of time period detected as above, and outputs the calculated oscillation frequency and the calculated amplitude of oscillation to a phase locked loop (PLL) circuit unit 30 (to be described later) and an amplitude controller 32 (to be described later).

Now, the path of the laser light in the laser scanner 2 will be described. As FIG. 1 illustrates, the laser light emitted from the light source 10 passes through the aperture of the mirror with the aperture 12, and is reflected off the scanning mirror 14. Here, the scanning mirror 14 oscillates about the axis C to scan the laser light reflected from the scanning mirror 14, for example, in the scanning range R1 toward the target object 20. The laser light scanned by the scanning mirror 14 passes through the optical element 8, and is emitted to the target object 20. The laser light scanned by the scanning mirror 14 traverses the detector 18 back and forth near one end of the scanning range R1. Part of the laser light reflected from the target object 20 is reflected off the scanning mirror 14 again, is further reflected off the reflective surface of the mirror with the aperture 12, and is received by the photodetector 16.

2. Functional Configuration of Laser Scanner

Figure 3:
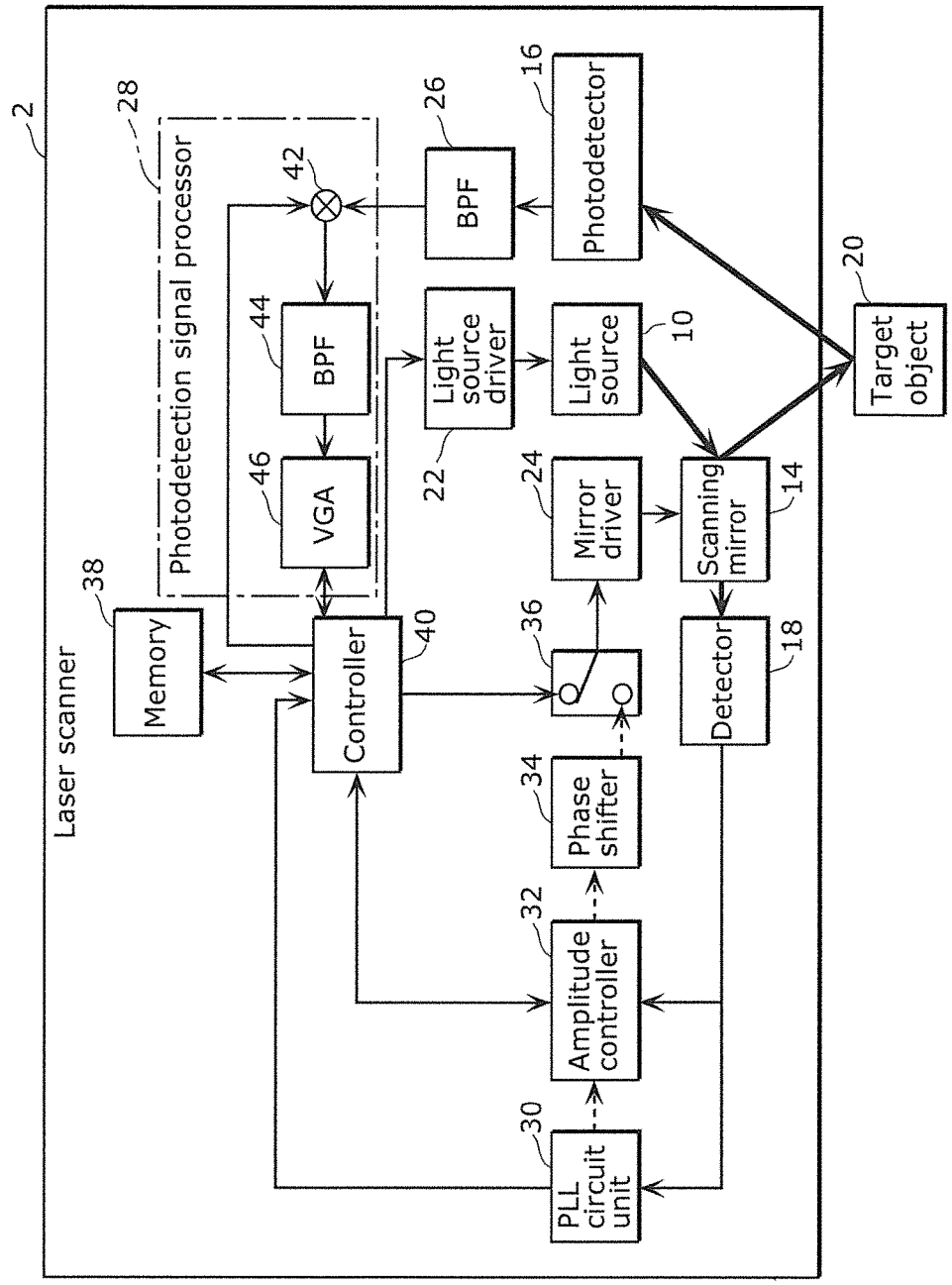
FIG. 3 is a block diagram of a functional configuration of the laser scanner at the time of startup of the laser scanner.
Figure 4:
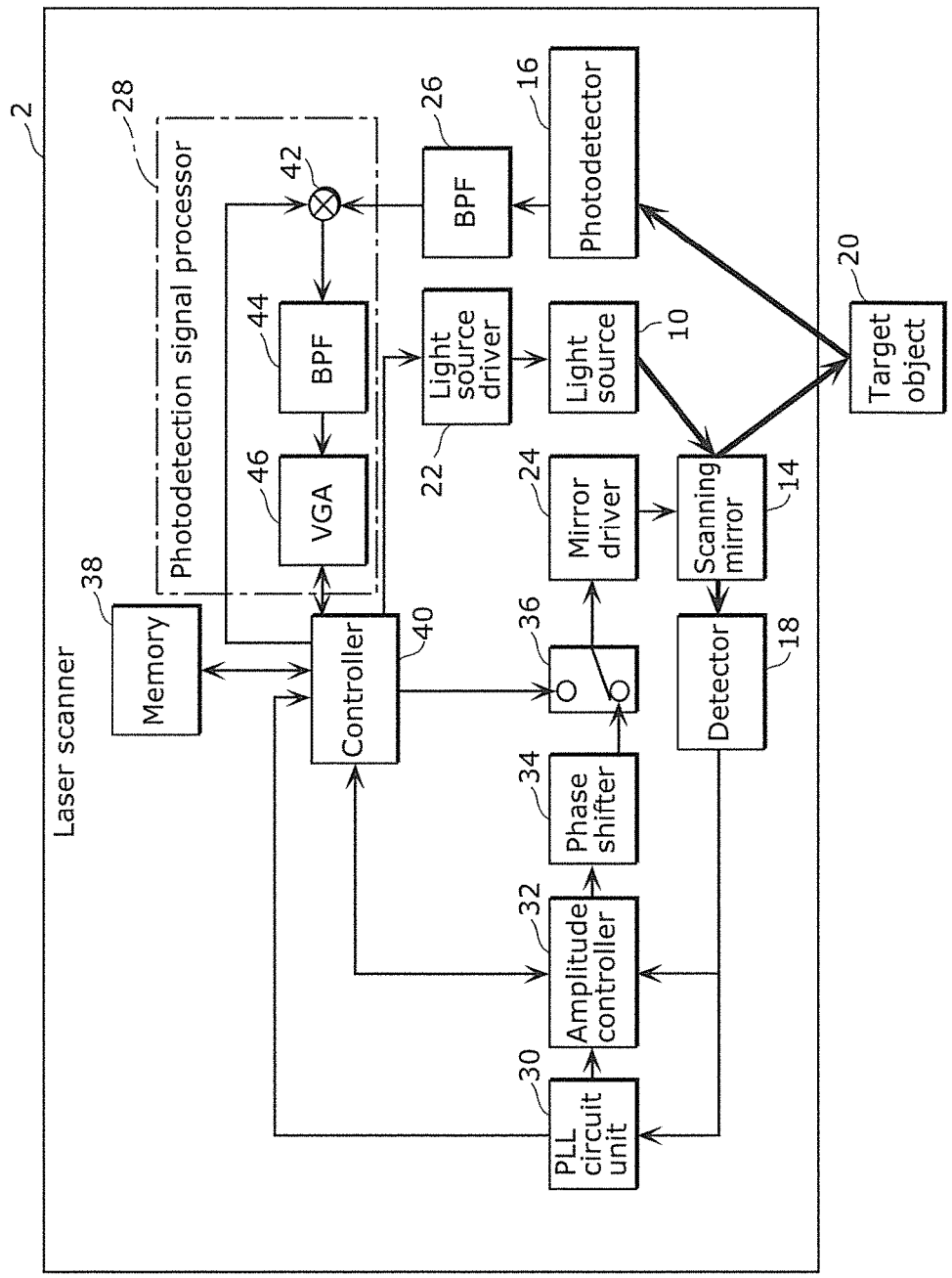
FIG. 4 is a block diagram of a functional configuration of the laser scanner in a self-oscillation mode.

Next, a functional configuration of the laser scanner 2 will be described with reference to FIG. 3 and FIG. 4. FIG. 3 is a block diagram of a functional configuration of a laser scanner at the time of startup of the laser scanner. FIG. 4 is a block diagram of a functional configuration of a laser scanner in a self-oscillation mode. In FIG. 3 and FIG. 4, thinner solid arrows and dashed arrows each indicate the flow of a signal, whereas the thicker solid arrows indicate the flow of laser light.

As FIG. 3 illustrates, the laser scanner 2 further include: a light source driver 22; a mirror driver 24; a band pass filter (BPF) 26; a photodetection signal processor 28; a PLL circuit unit 30, an amplitude controller 32; a phase shifter 34; a switch 36; a memory 38; and a controller 40.

The light source driver 22 generates a modulated signal for causing the light source 10 to emit laser light, based on a light source driving signal output from the controller 40. The light source driver 22 outputs the generated modulated signal to the light source 10. Accordingly, the light source 10 emits laser light.

The mirror driver 24 generates driving current for driving the scanning mirror 14, based on a mirror driving signal output from the phase shifter 34 (or an external clock signal output from the controller 40). The mirror driver 24 outputs the generated driving current to the oscillator. Accordingly, the scanning mirror 14 is oscillated by the oscillator about the axis C, for example, in the scanning range R1.

The BPF 26 receives the photodetection signal generated by the photodetector 16. The BPF 26 performs predetermined filtering on the photodetection signal, and outputs the filtered photodetection signal to the photodetection signal processor 28.

The photodetection signal processor 28 includes: a mixer 42, a BPF 44, and a variable gain amplifier (VGA) 46. The mixer 42 obtains the photodetection signal output from the BPF 26 at the timing based on the timing clock signal output from the controller 40. The BPF 44 performs predetermined filtering on the photodetection signal obtained by the mixer 42, and outputs the filtered photodetection signal to the VGA 42. The VGA 46 amplifies the level of the photodetection signal output from the BPF 44, and outputs the amplified photodetection signal to the controller 40. The photodetection signal processor 28 may include a band elimination filter (BEF) instead of the BPF 44.

The PLL circuit unit 30 generates, based on the oscillation frequency output from the detector 18, a timing clock signal having a phase synchronized with a phase of the oscillation frequency. The PLL circuit unit 30 outputs the generated timing clock signal to the controller 40 at the time of startup of the laser scanner 2 (that is, before the laser scanner 2 is changed into the self-oscillation mode to be described later). On the other hand, after the laser scanner 2 is changed into the self-oscillation mode, the PLL circuit unit 30 outputs the generated timing clock signal to the controller 40 and the amplitude controller 32.

At the time of startup of the laser scanner 2, the amplitude controller 32 outputs amplitude voltage to the controller 40 based on the amplitude of oscillation output from the detector 18. On the other hand, after the laser scanner 2 is changed into the self-oscillation mode, the amplitude controller 32 generates a mirror driving signal for keeping the amplitude of oscillation of the scanning mirror 14 maximum, based on the amplitude of oscillation output from the detector 18 and the timing clock signal output from the PLL circuit unit 30. The amplitude controller 32 then outputs the generated mirror driving signal to the mirror driver 24 via the phase shifter 34 and the switch 36. After the laser scanner 2 is changed into the self-oscillation mode, the amplitude controller 32 outputs amplitude voltage to the controller 40 based on the amplitude of oscillation output from the detector 18 in a similar manner to the startup of the laser scanner 2.

In the self-oscillation mode, the phase shifter 34 compensates for phase shifting of the mirror driving signal caused due to the loop from the detector 18, the PLL circuit unit 30, the amplitude controller 32, the phase shifter 34, to the mirror driver 24.

The switch 36 switches connection of the mirror driver 24 between the controller 40 and the phase shifter 34, based on a switch signal from the controller 40. Specifically, as FIG. 3 illustrates, the switch 36 switches the connection of the mirror driver 24 to the controller 40 based on the switch signal from the controller 40, at the time of startup of the laser scanner 2. On the other hand, as FIG. 4 illustrates, when the laser scanner 2 is changed into the self-oscillation mode, the switch 36 switches the connection of the mirror driver 24 to the phase shifter 34, based on the switch signal from the controller 40.

The memory 38 includes, for example, a random access memory (RAM). The memory 38 stores various kinds of threshold ranges used by the controller 40 for determining a defective state of the laser scanner 2 (to be described later).

The controller 40 includes an electric circuit including, for example, a system large scale integrated (system LSI) circuit, an integrated circuit (IC) or a microcontroller.

At the time of startup of the laser scanner 2, the controller 40 outputs an external clock signal of a predetermined frequency to the mirror driver 24 via the switch 36. Accordingly, the mirror driver 24 oscillates the scanning mirror 14 at the frequency based on the external clock signal.

Moreover, after the laser scanner 2 is changed into the self-oscillation mode, the controller 40 determines the time at which laser light is emitted from the light source 10 and the time at which sampling is performed on the photodetection signal, based on the timing clock signal output from the PLL circuit unit 30. In other words, the controller 40 outputs a light source driving signal having a phase synchronized with a phase of the timing clock signal, to the light source driver 22, and also performs sampling on the photodetection signal output from the photodetection signal processor 28, synchronously with the timing clock signal. Accordingly, the light source 10 emits light synchronously with the timing clock signal.

Moreover, the controller 40 calculates (measures) the distance between the laser scanner 2 and the target object 20, based on a phase difference between the laser light emitted from the light source 10 and the laser light received by the photodetector 16. Specifically, the controller 40 calculates, using the phase difference, an elapse of time from when the laser light is emitted from the light source 10 until when the laser light is received by the photodetector 16. The controller 40 then calculates the distance by multiplying half the calculated time by the speed of light.

Moreover, the controller 40 outputs a switch signal to the switch 36 when the laser scanner 2 is started and when the laser scanner 2 is changed into the self-oscillation mode.

Moreover, the controller 40 determines whether or not the laser scanner 2 is in a defective state, based on the oscillation frequency and the amplitude of oscillation which have been calculated by the detector 18. Specifically, when the controller 40 cannot detect the oscillation frequency (or amplitude of oscillation) calculated by the detector 18 at the time of startup of the laser scanner 2, the controller 40 determines that the laser scanner 2 is in a defective state and outputs an error signal. Based on the error signal, for example, details of the error are displayed on a display unit (not illustrated) included in the enclosure 6. Moreover, at the time of startup of the laser scanner 2, when the number of times the frequency of an external clock signal with a maximum amplitude of oscillation falls out of a threshold range reaches a predetermined detection error count (for example, 10 times), the controller 40 determines that the laser scanner 2 is in a defective state and outputs an error signal.

On the other hand, after the laser scanner 2 is changed into the self-oscillation mode, when the number of times the frequency of the timing clock signal output from the PLL circuit unit 30 falls out of a threshold range stored in the memory 38 reaches a predetermined detection error count (for example, 10 times), the controller 40 determines that the laser scanner 2 is in a defective state and outputs an error signal. Moreover, after the laser scanner 2 is changed into the self-oscillation mode, when the number of times the amplitude voltage output from the amplitude controller 32 falls out of a threshold range stored in the memory 38 reaches a predetermined detection error count (for example, 10 times), the controller 40 determines that the laser scanner 2 is in a defective state and outputs an error signal.

3. Operation of Laser Scanner

Figure 5:
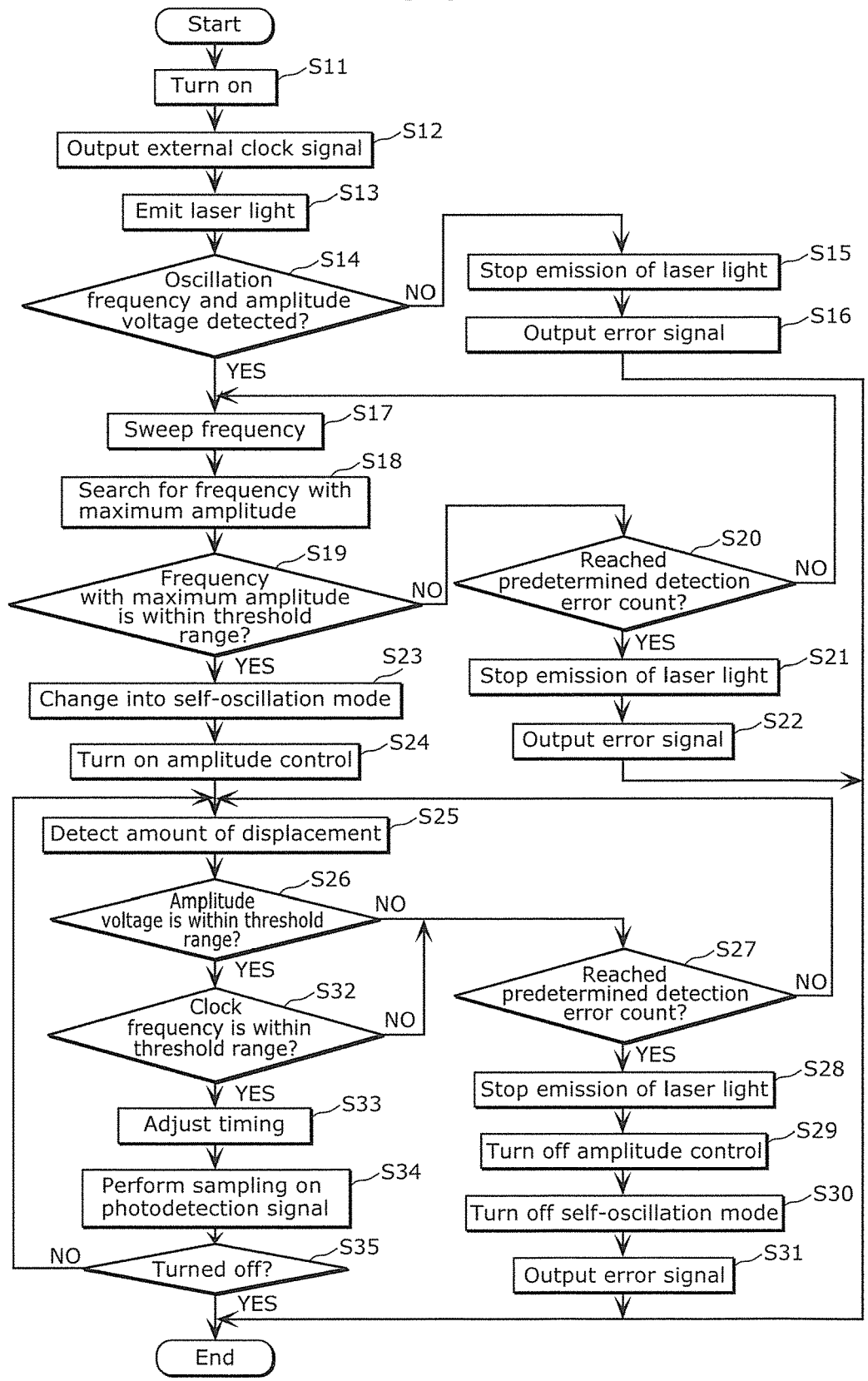
FIG. 5 is a flowchart of an operation of the laser scanner according to the embodiment.
Figure 6:
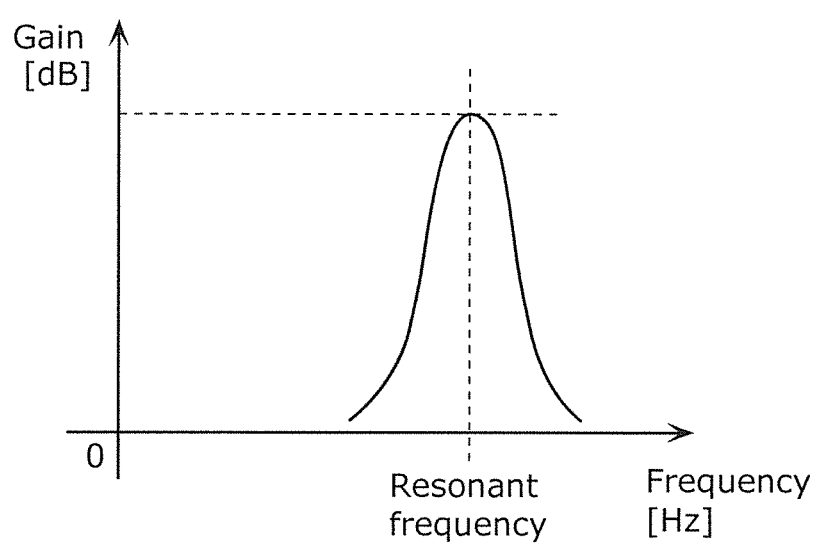
FIG. 6 is a graph illustrating a relationship between oscillation frequency and gain characteristics of a scanning mirror.

Next, an operation of the laser scanner 2 will be described with reference to FIG. 3 through FIG. 5. FIG. 5 is a flowchart of an operation of the laser scanner according to the embodiment.

[3-1. Operation of Laser Scanner at Startup]

As FIG. 5 illustrates, when the laser scanner 2 is turned on (S11), the laser scanner 2 is started. At the time of startup of the laser scanner 2, as FIG. 3 illustrates, the switch 36 switches the connection of the mirror driver 24 to the controller 40 based on a switch signal from the controller 40. At the time of startup of the laser scanner 2, the controller 40 keeps the amplitude control by the amplitude controller 32 (generation of a mirror driving signal) off.

The controller 40 outputs an external clock signal to the mirror driver 24 via the switch 36 (S12). Accordingly, the mirror driver 24 oscillates the scanning mirror 14 at the frequency of the external clock signal. After an elapse of a predetermined time (for example, a few seconds) from the startup of the laser scanner 2, the controller 40 drives the light source driver 22 to cause the light source 10 to emit laser light (S13).

Here, when the scanning mirror 14 is not properly oscillating, the controller 40 does not detect the timing clock signal from the PLL circuit unit 30 or the amplitude voltage from the amplitude controller 32 (No in S14). In this case, the controller 40 determines that the laser scanner 2 is in a defective state, stops emission of the laser light (S15), and outputs an error signal (S16). Accordingly, for example, it is possible to prevent the laser light from being continuously emitted to the same portion of the target object 20.

On the other hand, when the scanning mirror 14 is properly oscillating, the controller 40 detects the timing clock signal from the PLL circuit unit 30 and the amplitude voltage from the amplitude controller 32 (Yes in S14). In this case, while sweeping the frequency of the external clock signal (S17), the controller 40 searches for the frequency (resonant frequency) of the external clock signal having a maximum amplitude voltage (that is, the frequency at which the amplitude of oscillation of the scanning mirror 14 is maximum) (S18).

When the controller 40 detects the frequency of the external clock signal having a maximum amplitude voltage, the controller 40 determines whether or not the frequency falls within a threshold range stored in the memory 38 (S19). When the frequency falls out of the threshold range (No in S19), steps S17 to S19 are repeatedly performed till the number of times the frequency falls out of the threshold range reaches a predetermined detection error count (No in S20). When the number of times the frequency falls out of the threshold range reaches the predetermined detection error count (Yes in S20), the controller 40 determines that the laser scanner 2 is in a defective state, stops emission of the laser light (S21), and outputs an error signal (S22).

On the other hand, the frequency of the external clock signal falls within the threshold range (Yes in S19), the controller 40 determines the frequency as the frequency at which the scanning mirror 14 is oscillated (resonant frequency), and causes the laser scanner 2 to change into the self-oscillation mode (S23).

[3-2. Operation in Self-Oscillation Mode]

As FIG. 4 illustrates, when the laser scanner 2 is changed into the self-oscillation mode, the switch 36 switches the connection of the mirror driver 24 to the phase shifter 34, based on a switch signal from the controller 40. The controller 40 turns on the amplitude control by the amplitude controller 32 (S24). Accordingly, the amplitude controller 32 generates a mirror driving signal for keeping the amplitude of oscillation of the scanning mirror 14 maximum, based on the amplitude of oscillation output from the detector 18 and the timing clock signal output from the PLL circuit unit 30. The amplitude controller 32 then outputs the generated mirror driving signal to the mirror driver 24 via the phase shifter 34 and the switch 36. As a result, the scanning mirror 14 oscillates at the maximum amplitude. In such a manner, in the self-oscillation mode, the amplitude controller 32 performs control based on the oscillation frequency and the amplitude of oscillation provided through feedback by the detector 18, such that the amplitude of oscillation of the scanning mirror 14 is maximum.

The detector 18 detects the amount of displacement of the scanning mirror 14 in the above described manner (S25). The controller 40 determines whether or not the amplitude voltage output from the amplitude controller 32 falls within a threshold range stored in the memory 38 (S26). When the amplitude voltage falls out of the threshold range (No in S26), steps S25 and S26 are repeatedly performed till the number of times the amplitude voltage falls out of the threshold range reaches a predetermined detection error count (No in S27). When the number of times amplitude voltage falls out of the threshold range reaches the predetermined error count (Yes in S27), the controller 40 determines that the laser scanner 2 is in a defective state and stops emission of the laser light (S28). The controller 40 turns off the amplitude control by the amplitude controller 32 (S29), turns off the self-oscillation mode (S30), and further outputs an error signal (S31).

On the other hand, when the amplitude voltage falls within the threshold range (Yes in S26), the controller 40 determines whether or not the frequency of the timing clock signal output from the PLL circuit unit 30 falls within a threshold range stored in the memory 38 (S32). When the frequency falls out of the threshold range (No in S32), steps S25, S26, and S32 are repeatedly performed till the number of times the frequency falls out of the threshold range reaches a predetermined detection error count (No in S27). When the number of times the frequency falls out of the threshold range reaches the predetermined error count (Yes in S27), the controller 40 determines that the laser scanner 2 is in a defective state and stops emission of the laser light (S28). The controller 40 turns off the amplitude control by the amplitude controller 32 (S29), turns off the self-oscillation mode (S30), and further outputs an error signal (S31).

When the frequency falls within the threshold range (Yes in S32), the controller 40 outputs a light source driving signal having a phase synchronized with the phase of the timing clock signal to the light source driver 22, and also performs sampling on the photodetection signal output from the photodetection signal processor 28 synchronously with the timing clock signal (S33 and S34). Accordingly, the light source 10 emits light synchronously with the timing clock signal. The controller 40 measures the distance between the laser scanner 2 and the target object 20 in the above described manner, for example, by performing sampling on the photodetection signal output from the photodetection signal processor 28.

When the laser scanner 2 is not off (No in S35), steps S25 to S34 are performed again. On the other hand, when the laser scanner 2 is externally and manually turned off (or when the laser scanner 2 is turned off by the controller 40 of the laser scanner 2 determining a circuit defect) (Yes in S35), the operation of the laser scanner 2 ends.

4. Advantageous Effects

Next, advantageous effects obtained by the laser scanner 2 according to the embodiment will be described. As described above, in the self-oscillation mode, the controller 40 performs sampling on the photodetection signal output from the photodetection signal processor 28, synchronously with the timing clock signal, and the light source 10 emits light synchronously with the timing clock signal. When the resonant frequency of the scanning mirror 14 changes, the PLL circuit unit 30 generates a timing clock signal having a phase synchronized with the phase of the changed resonant frequency. The controller 40 calculates the time at which the deflection angle of the scanning mirror 14 becomes a predetermined deflection angle (see FIG. 1), based on the oscillation frequency (resonant frequency) and the amplitude of oscillation calculated by the detector 18. The predetermined deflection angle θ of the scanning mirror 14 is, as FIG. 1 illustrates, the angle formed by the axis of the laser light reflected from the scanning mirror 14 and the central axis A of the scanning range.

Accordingly, when the resonant frequency of the scanning mirror 14 changes, the controller 40 determines, based on the calculate time and the timing clock signal, the time at which the laser light is emitted from the light source 10 to the scanning mirror 14 having the predetermined deflection angle θ, and the time at which sampling is performed on the photodetection signal for the laser light reflected from the scanning mirror 14 having the predetermined deflection angle θ. In other words, the controller 40 performs sampling on the photodetection signal output from the photodetection signal processor 28 synchronously with the operation of the scanning mirror 14, and the light source 10 emits laser light synchronously with the operation of the scanning mirror 14. As a result, even when the resonant frequency of the scanning mirror 14 changes, the laser light reflected from the same measurement point on the target object 20 can be received at accurate timing.

Even when the resonant frequency of the scanning mirror 14 changes, the amplitude controller 32 performs control such that the amplitude of oscillation of the scanning mirror 14 is kept maximum.

(Variation)

Although the laser scanner 2 according to the embodiment of the present invention has been described above, the present invention is not limited to the above embodiment.

In the embodiment, the scanning mirror 14 oscillates in one axial direction. However, the present invention is not limited to such an example. The scanning mirror 14 may oscillate in two axial directions (for example, horizontally and vertically).

In the embodiment, the controller 40 stops emission of laser light when determining that the laser scanner 2 is in a defective state. However, the present invention is not limited to the example. For example, the controller 40 may stop oscillation of the scanning mirror 14 as well as emission of the laser light. Alternatively, the controller 40 may turn off the laser scanner 2, or restart the laser scanner 2.

In the embodiment, the controller 40 measures the distance between the laser scanner 2 and the target object 20 based on the laser light received by the photodetector 16, but is also capable of measuring the shape of the target object 20. In this case, the shape of the target object 20 can be measured through arithmetic processing by measuring approximately how much the measurement point on the target object 20 has changed temporally while oscillating the scanning mirror 14 at a predetermined amplitude.

In the embodiment, in the self-oscillation mode, the amplitude controller 32 generates a mirror driving signal based on the timing clock signal output from the PLL circuit unit 30 and the amplitude of oscillation output from the detector 18. However, it may be that the controller 40 generates a mirror driving signal based on the timing clock signal output from the PLL circuit unit 30 and the amplitude of oscillation output from the detector 18, and outputs the generated mirror driving signal to the amplitude controller 32.

Moreover, for example, in step S18, it may be that the maximum value of the amplitude voltage output from the amplitude controller 32 is temporarily stored in the memory 38, and the controller 40 sets the resonant frequency of the scanning mirror 14 by executing comparison operation and the like.

In the embodiment, the laser scanner 2 is used as a laser rangefinder for measuring the distance between the laser scanner 2 and the target object 20. However, the laser scanner 2 according to the present invention is not limited to the example. For example, the laser scanner 2 may be used as a sensor for identifying the shape of a target object carried by a conveyer belt.

(Other Variation)

Moreover, each device described above may be configured in, specifically, a computer system which includes a microprocessor, a read only memory (ROM), a random access memory (RAM), a hard disk drive, a display unit, a keyboard, a mouse, and so on. A computer program is stored in the RAM or the hard disk drive. The function of each device is performed by the microprocessor operating according to the computer program. Here, the computer program includes a combination of a plurality of instruction codes for giving instructions to the computer to perform predetermined functions.

Furthermore, some or the whole of the components included in each device described above may be configured with one system LSI circuit. The system LSI circuit is a super multi-function LSI circuit fabricated by integrating a plurality of components on one chip, and is, specifically, a computer system which includes a microprocessor, a ROM, a RAM, and so on. A computer program is stored in the RAM. The system LSI circuit performs its functionality by the microprocessor operating according to the computer program.

Furthermore, some or the whole of the components included in each device described above may be configured with an IC card or a single module detachable to each device. The IC card or the module is a computer system which includes a microprocessor, a ROM, a RAM, and so on. The IC card or the module may include the super multi-function LSI circuit described above. The IC card or the module performs its functionality by the microprocessor operating according to the computer program. The IC card or the module may be of tamper-resistant.

Moreover, the present invention may be implemented in the above-described method. Moreover, the present invention may be achieved in a computer program implementing such a method via a computer, or may be implemented in a digital signal that comprises the computer program.

Furthermore, the present invention may be achieved in a non-transitory computer-readable recording medium having stored therein the computer program or the digital signal, such as a flexible disk, a hard disk, CD-ROM, MO, DVD, DVD-ROM, DVD-RAM, BD (Blu-ray (registered trademark) Disc), and a semiconductor memory. Moreover, the present invention may be implemented in the digital signal stored in such a non-transitory recording medium.

Moreover, the present invention may be achieved in transmitting the computer program or the digital signal via an electric communication line, a wireless or wired communication line, a network represented by the Internet, data broadcast, or the like.

Moreover, the present invention may be achieved in a computer system which includes a microprocessor and a memory. The memory may store the computer program and the microprocessor may operate according to the computer program.

Moreover, by transferring the program or the digital signal in the non-transitory recording medium or transferring the program or the digital signal via the network or the like, the program or the digital signal may be executed in another independent computer system.

Although only some exemplary embodiments of the present invention have been described in detail above, those skilled in the art will readily appreciate that many modifications are possible in the exemplary embodiments without materially departing from the novel teachings and advantages of the present invention. Accordingly, all such modifications are intended to be included within the scope of the present invention.

INDUSTRIAL APPLICABILITY

A laser scanner according to present invention is applicable as, for example, a laser rangefinder for measuring the distance between the laser scanner and a target object.

The invention claimed is:

1. A laser scanner for scanning laser light toward a target object, the laser scanner comprising:
a light source that emits laser light;
a scanning mirror that scans the laser light emitted from the light source, toward the target object by oscillating about a predetermined axis;
a photodetector that generates a photodetection signal upon receiving the laser light reflected from the target object;
a controller that controls emission of the laser light by the light source, and that performs sampling on the photodetection signal; and
a detector that detects an amount of displacement of the scanning mirror, and calculates a resonant frequency of the scanning mirror based on the amount of displacement detected,
wherein, when the resonant frequency calculated changes, the controller determines a time at which the laser light is emitted from the light source and a time at which sampling is performed on the photodetection signal, so as to synchronize with the resonant frequency changed.

2. The laser scanner according to claim 1,
wherein the detector further calculates an amplitude of oscillation of the scanning mirror based on the amount of displacement detected,
the controller calculates a time at which a deflection angle of the scanning mirror becomes a predetermined deflection angle, based on the resonant frequency calculated and the amplitude of oscillation calculated, and determines, based on the time calculated and the resonant frequency calculated, a time at which the laser light is emitted from the light source toward the scanning mirror having the predetermined deflection angle, and a time at which sampling is performed on the photodetection signal for the laser light reflected from the scanning mirror having the predetermined deflection angle.

3. The laser scanner according to claim 1, further comprising
a phase locked loop (PLL) circuit unit that generates a timing clock signal having a phase synchronized with a phase of the resonant frequency calculated by the detector,
wherein the controller determines a time at which the laser light is emitted from the light source and a time at which sampling is performed on the photodetection signal, based on the timing clock signal.

4. The laser scanner according to claim 3, further comprising
a light source driver that causes the light source to emit the laser light, based on a light source driving signal output from the controller,
wherein the controller outputs, to the light source driver, the light source driving signal having a phase synchronized with the phase of the timing clock signal.

5. The laser scanner according to claim 1,
wherein the controller determines that the laser scanner is in a defective state, when a value related to the resonant frequency calculated falls outside a first threshold range.

6. The laser scanner according to claim 5,
wherein the detector further calculates an amplitude of oscillation of the scanning mirror based on the amount of displacement detected, and the controller determines that the laser scanner is in a defective state, when a value related to the amplitude of oscillation calculated falls outside a second threshold range.

7. The laser scanner according to claim 5,
wherein the controller causes the light source to stop emitting the laser light when the controller determines that the laser scanner is in the defective state.

8. The laser scanner according to claim 7,
wherein the controller causes the light source to stop emitting the laser light and causes the scanning mirror to stop oscillating, when the controller determines that the laser scanner is in the defective state.

9. The laser scanner according to claim 5,
wherein the controller turns off the laser scanner when the controller determines that the laser scanner is in the defective state.

10. The laser scanner according to claim 5,
wherein the controller restarts the laser scanner when the controller determines that the laser scanner is in the defective state.

11. The laser scanner according to claim 1,
wherein the detector receives the laser light scanned by the scanning mirror toward the target object, and detects, as the amount of displacement, a length of a time period between two successive receptions of the laser light, the two successive receptions of the laser light resulting from the laser light traversing the detector back and forth.

12. The laser scanner according to claim 1,
wherein the controller calculates a distance between the laser scanner and the target object based on a phase difference between the laser light emitted from the light source and the laser light received by the photodetector.

* * * * *